US012176174B2

(12) United States Patent
Fujita et al.

(10) Patent No.: US 12,176,174 B2
(45) Date of Patent: Dec. 24, 2024

(54) PHOTOELECTRON MULTIPLYING AND COLLECTING TUBE AND IMAGING DEVICE USING SAME

(71) Applicant: HAMAMATSU PHOTONICS K.K., Hamamatsu (JP)

(72) Inventors: Tetsuya Fujita, Hamamatsu (JP); Takahiro Suzuki, Hamamatsu (JP); Yasuhide Miyazaki, Hamamatsu (JP); Naoya Kawai, Hamamatsu (JP); Peter Uhd Jepsen, Copenhagen S (DK); Simon Lehnskov Lange, Copenhagen NV (DK)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 343 days.

(21) Appl. No.: 17/619,686

(22) PCT Filed: Jun. 19, 2020

(86) PCT No.: PCT/JP2020/024219

§ 371 (c)(1),
(2) Date: Dec. 16, 2021

(87) PCT Pub. No.: WO2020/262254

PCT Pub. Date: Dec. 30, 2020

(65) Prior Publication Data

US 2022/0319794 A1 Oct. 6, 2022

(30) Foreign Application Priority Data

Jun. 26, 2019 (EP) .................................... 19182652

(51) Int. Cl.
*H01J 31/48* (2006.01)
*H01J 29/86* (2006.01)

(52) U.S. Cl.
CPC ............ *H01J 31/48* (2013.01); *H01J 29/865* (2013.01); *H01J 29/867* (2013.01)

(58) Field of Classification Search
CPC ........ H01J 31/48; H01J 29/865; H01J 29/867; H01J 31/49; H01J 1/3042; H01J 1/34;
(Continued)

(56) References Cited

U.S. PATENT DOCUMENTS 3,814,968 A * 6/1974 Nathanson .............. H01J 31/49 313/367
5,591,986 A 1/1997 Niigaki et al.
(Continued)

FOREIGN PATENT DOCUMENTS

CN 1093489 A 10/1994
CN 103026449 A 4/2013
(Continued)

OTHER PUBLICATIONS

"Terahertz metamaterial—Wikipedia," URL:https://en.wikipedia.org/wiki/Terahertz_metamaterial, Sep. 29, 2019 , XP055644415, 15 pages.
(Continued)

*Primary Examiner* — David A Vanore
(74) *Attorney, Agent, or Firm* — Faegre Drinker Biddle & Reath LLP

(57) ABSTRACT

An electron tube includes a housing that is internally held in a vacuum and has a window transmitting an electromagnetic wave, an electron emitting unit that is disposed in the housing and has a meta-surface emitting electrons in response to incidence of the electromagnetic wave, an electron multiplying unit that is disposed in the housing and multiplies the electrons emitted from the electron emitting unit, and an electron collecting unit that is disposed in the housing and collects the electrons multiplied by the electron
(Continued)

multiplying unit. The window contains at least one selected from quartz, silicon, germanium, sapphire, zinc selenide, zinc sulfide, magnesium fluoride, lithium fluoride, barium fluoride, calcium fluoride, magnesium oxide, and calcium carbonate.

10 Claims, 14 Drawing Sheets

(58) Field of Classification Search
CPC .... H01J 40/06; H01J 43/08; H01J 2231/5001; H01J 2231/50026; H01J 2231/5016; H01J 1/78; H01J 43/10; H01J 43/12
See application file for complete search history.

(56) References Cited

U.S. PATENT DOCUMENTS

| | | | | |
|---|---|---|---|---|
| 2008/0042563 | A1* | 2/2008 | Niigaki | H01J 31/48 313/542 |
| 2010/0148667 | A1 | 6/2010 | Nigaki et al. | |
| 2011/0240855 | A1* | 10/2011 | Ohshima | H01J 37/065 313/310 |
| 2012/0013989 | A1* | 1/2012 | Choi | G02B 1/007 216/13 |
| 2016/0021620 | A1 | 1/2016 | Chen | |
| 2018/0151338 | A1 | 5/2018 | Conley | |
| 2022/0319794 | A1* | 10/2022 | Fujita | H01J 1/78 |
| 2023/0071586 | A1* | 3/2023 | Miyazaki | H01J 43/246 |

FOREIGN PATENT DOCUMENTS

| | | | |
|---|---|---|---|
| CN | 103227097 | A | 7/2013 |
| EP | 0558308 | A1 * | 5/1995 |
| JP | H07-78554 | A | 3/1995 |
| JP | 2008-016293 | A | 1/2008 |
| WO | WO-2012/078043 | A1 | 6/2012 |
| WO | WO-2015/028029 | A1 | 3/2015 |

OTHER PUBLICATIONS

"Electromagnetic metasurface—Wikipedia," URL:https://en.wikipedia.org/wiki/Electromagnetic_metasurface, Jul. 8, 2020, XP055716025, 5 pages.

Ashihara, Satoshi, "Mid-infrared plasmonic field enhancement and its application to novel nonlinear optical phenomena," KAKENHI/Grants-in-Aid for Scientific Research Research Report, Jun. 8, 2016.

Written Opinion of the International Searching Authority mailed Sep. 11, 2020 for PCT/JP2020/024219.

Yu, Nanfang et al., "Flat optics with designer metasurfaces," Nature Materials, vol. 13, No. 2, Jan. 23, 2014, pp. 139-150, XP055707237.

* cited by examiner

PHOTOELECTRON MULTIPLYING AND COLLECTING TUBE AND IMAGING DEVICE USING SAME

TECHNICAL FIELD

The present invention relates to an electron tube and an imaging device.

BACKGROUND ART

Known terahertz-wave detectors include a substrate with a metamaterial structure and a photo sensor. (see, for example, Patent Literature 1). The terahertz-wave is incident on the substrate.

CITATION LIST

Patent Literature

Patent Literature 1: US Unexamined Patent Application Publication No. 2016/0216201

SUMMARY OF INVENTION

Technical Problem

In the detector described in Patent Literature 1, when the terahertz-wave is incident on the substrate with the metamaterial structure, the substrate emits an electron. For example, the electron emitted from the substrate excite a molecule included in the atmosphere. The excited molecule generates light. The photo sensor detects the generated light. The detector tends not to detect the terahertz-wave having weak intensity.

An object of one aspect of the present invention is to provide an electron tube that ensures detection accuracy of an electromagnetic wave. An object of another aspect of the present invention is to provide an imaging device that ensures detection accuracy of an electromagnetic wave.

Solution to Problem

An electron tube according to one aspect of the present invention includes a housing, an electron emitting unit, an electron multiplying unit, and an electron collecting unit. The housing is internally held in a vacuum and includes a window transmitting an electromagnetic wave. The electron emitting unit is disposed in the housing. The electron emitting unit includes a meta-surface emitting an electron in response to incidence of the electromagnetic wave. The electron multiplying unit is disposed in the housing. The electron multiplying unit multiplies the electron emitted from the electron emitting unit. The electron collecting unit is disposed in the housing. The electron collecting unit collects electrons multiplied by the electron multiplying unit. The window includes at least one selected from quartz, silicon, germanium, sapphire, zinc selenide, zinc sulfide, magnesium fluoride, lithium fluoride, barium fluoride, calcium fluoride, magnesium oxide, and calcium carbonate.

In the one aspect, the window included in the housing includes at least one selected from quartz, silicon, germanium, sapphire, zinc selenide, zinc sulfide, magnesium fluoride, lithium fluoride, barium fluoride, calcium fluoride, magnesium oxide, and calcium carbonate. Therefore, it is possible to ensure the intensity of the electromagnetic wave guided into the housing, for example, an electromagnetic wave in a frequency band from a terahertz-wave to infrared light. When the electromagnetic wave passed through the window is incident on the meta-surface of the electron emitting unit, the electron is emitted from the electron emitting unit. The emitted electron is multiplied by the electron multiplying unit in the housing. In the electron collecting unit, the multiplied electrons are collected. Therefore, detection accuracy is ensured for the above-mentioned electromagnetic wave.

In the one aspect, the electron emitting unit may include a substrate including a first principal surface provided with the meta-surface and a second principal surface opposite to the first principal surface. The electron multiplying unit may include an incidence surface on which the electron emitted from the electron emitting unit is incident. The substrate may have transparency for the electromagnetic wave passing through the window. The substrate may be disposed in such a manner that the first principal surface faces the incidence surface of the electron multiplying unit and the second principal surface faces the window. In this case, in a configuration in which the electromagnetic wave passed through the window and the substrate is incident on the meta-surface, the electron emitted from the meta-surface in response to the incidence of the electromagnetic wave is guided to the electron multiplying unit with a simple configuration.

In the one aspect, the electron multiplying unit may include an incidence surface on which the electron emitted from the electron emitting unit is incident. The meta-surface may be provided on the window to face the incidence surface of the electron multiplying unit. In this case, a substrate provided with the meta-surface is not required in the housing. Therefore, a size and a weight of the electron tube can be reduced.

In the one aspect, the electron emitting unit may include a substrate including a first principal surface provided with the meta-surface and a second principal surface opposite to the first principal surface. The electron multiplying unit may include an incidence surface on which the electron emitted from the electron emitting unit is incident. The substrate may be disposed such that the first principal surface faces the window and the incidence surface of the electron multiplying unit. In this case, in a configuration in which the electromagnetic wave passed through the window is incident on the meta-surface without passing through the substrate, the electron emitted from the meta-surface in response to the incidence of the electromagnetic wave is guided to the electron multiplying unit with a simple configuration.

In the one aspect, the meta-surface may be included in a patterned oxide layer or a patterned metal layer. In this case, the electrons emitted from the meta-surface in response to the incidence of the electromagnetic wave increase.

In the one aspect, the electron multiplying unit and the electron collecting unit may be a diode and may be integrally configured. In this case, a size of the electron tube can be further reduced.

In the one aspect, the electron multiplying unit may include a plurality of dynodes separated from each other. The electron collecting unit may include an anode or a diode arranged to collect the electrons multiplied by the electron multiplying unit. In this case, the electron emitted from the meta-surface is multiplied by a plurality of dynodes. Therefore, a multiplication factor of the electrons collected by the anode or the diode is improved.

In the one aspect, the electron multiplying unit may include a microchannel plate. The electron collecting unit may include an anode or a diode arranged to collect the electrons multiplied by the electron multiplying unit. In this case, a size, a weight, and power consumption are reduced and a response speed and a gain are improved, as compared with in a case in which the electron multiplying unit includes a plurality of dynodes.

In the one aspect, the electron multiplying unit may include a microchannel plate. The electron collecting unit may include a fluorescent body arranged to receive the electrons multiplied by the electron multiplying unit and emit light. In this case, two-dimensional positions of the electron emitted from the meta-surface can be detected by the light emitted from the fluorescent body.

An imaging device according to another aspect of the present invention includes the electron tube and an imaging unit configured to capture an image based on the light from the fluorescent body. In another aspect, detection accuracy of the electromagnetic wave is ensured.

Advantageous Effects of Invention

According to one aspect of the present invention, it is possible to provide an electron tube that ensures detection accuracy of an electromagnetic wave. According to another aspect of the present invention, it is possible to provide an imaging device that ensures detection accuracy of an electromagnetic wave.

DESCRIPTION OF EMBODIMENTS

Figure 1:
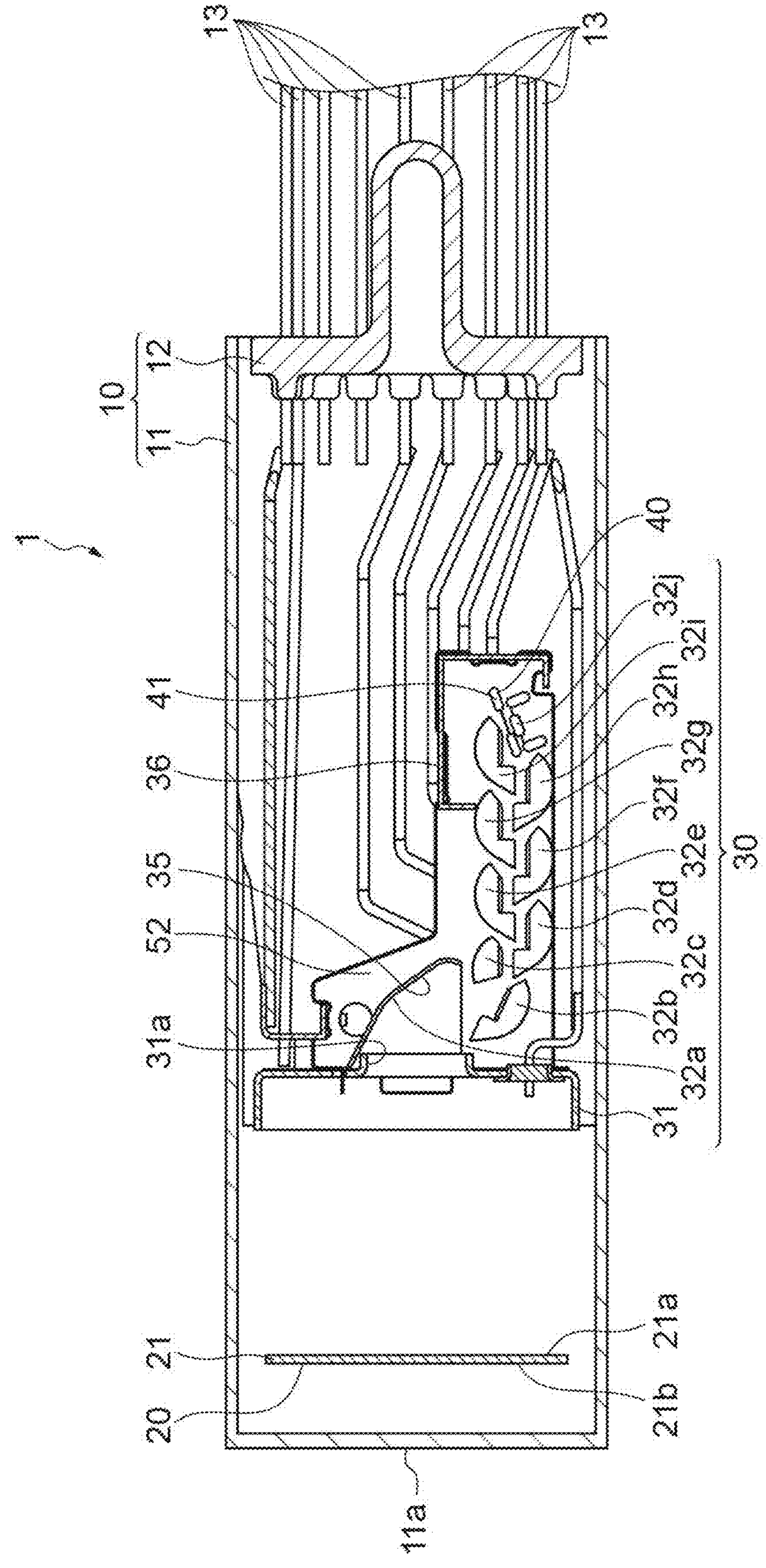
FIG. 1 is a cross-sectional view illustrating an electron tube according to an embodiment.

Hereinafter, embodiments of the present invention will be described in detail with reference to the accompanying drawings. In the description, the same elements or elements having the same functions will be denoted with the same reference numerals and a redundant explanation will be omitted.

Figure 2:
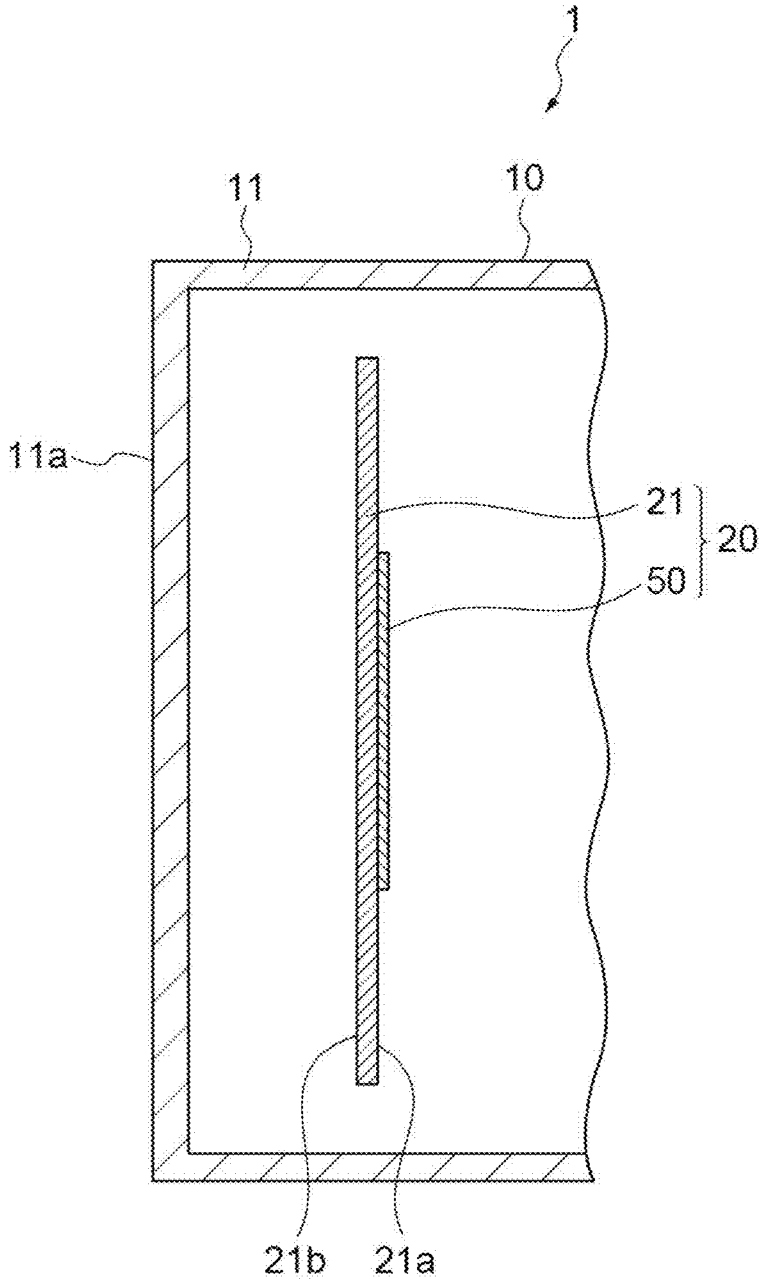
FIG. 2 is a partially enlarged view of the electron tube.

First, a configuration of an electron tube according to an embodiment of the present invention will be described with reference to FIGS. 1 to 4. FIG. 1 is a cross-sectional view illustrating an example of the electron tube. FIG. 2 is a partial enlarged view illustrating the example of the electron tube.

An electron tube 1 is a photomultiplier tube that outputs an electric signal in response to incidence of an electromagnetic wave. When the electromagnetic wave is incident, the electron tube 1 internally emits electron and multiplies the emitted electron. In the present specification, the "electromagnetic wave" incident on the electron tube is an electromagnetic wave included in a frequency band from a so-called millimeter wave to infrared light. As illustrated in FIG. 1, the electron tube 1 includes a housing 10, an electron emitting unit 20, an electron multiplying unit 30, and an electron collecting unit 40.

The housing 10 includes a valve 11 and a stem 12. An inner portion of the housing 10 is airtightly sealed with the valve 11 and the stem 12 and is held in a vacuum. The vacuum includes not only an absolute vacuum but also a state where the housing is filled with gas having a pressure lower than an atmospheric pressure. For example, the inner portion of the housing 10 is held at 1×10−4 to 1×10−7 Pa. The valve 11 includes a window 11*a* that transmits the electromagnetic wave. The housing 10 has a cylindrical shape, for example. In the embodiment, the housing 10 has a circular cylindrical shape. The stem 12 configures a bottom surface of the housing 10. The valve 11 configures a side surface of the housing 10 and a bottom surface facing the stem 12.

The window 11*a* configures a bottom surface facing the stem 12. For example, the window 11*a* has a circular shape in plan view. The window 11*a* includes at least one selected from quartz, silicon, germanium, sapphire, zinc selenide, zinc sulfide, magnesium fluoride, lithium fluoride, barium fluoride, calcium fluoride, magnesium oxide, and calcium carbonate. In the embodiment, the window 11*a* is made of quartz. A frequency characteristic of transmittance of the electromagnetic wave is different depending on a material. Therefore, a material of the window 11*a* may be selected depending on a frequency band of the electromagnetic wave passing through the window 11*a*. For example, the quartz may be selected as a material of a member transmitting an electromagnetic wave having a frequency band of 0.1 to 5 THz, the silicon may be selected for a material of a member transmitting an electromagnetic wave having a frequency band of 0.04 to 11 THz and 46 THz or more, the magnesium fluoride may be selected for a material of a member transmitting an electromagnetic wave having a frequency band of 40 THz or more, the germanium may be selected for a material of a member transmitting an electromagnetic wave having a frequency band of 13 THz or more, and the zinc selenide may be selected for a material of a member transmitting an electromagnetic wave having a frequency band of 14 THz or more.

The electron tube 1 includes a plurality of wires 13 for enabling electrical connection between an outer portion and an inner portion of the housing 10. The plurality of wires 13 are, for example, lead wires or pins. In the embodiment, the plurality of wires 13 are pins penetrating the stem 12 and extend from the inner portion of the housing 10 to the outer portion thereof. At least one of the plurality of wires 13 is connected to various members provided in the inner portion of the housing 10.

The electron emitting unit 20 is disposed in the housing 10 and emits electron in response to the incidence of the electromagnetic wave in the housing 10. The electron emitting unit 20 includes a meta-surface 50 and a substrate 21 provided with the meta-surface 50. The substrate 21 has transparency for the electromagnetic wave passing through the window 11a. In the present specification, the "transparency" means a property of transmitting at least a partial frequency band of the incident electromagnetic wave. That is, the substrate 21 transmits at least a partial frequency band of the electromagnetic wave passed through the window 11a. The substrate 21 is made of, for example, silicon. The substrate 21 has a rectangular shape in plan view. The substrate 21 is separated from the window 11a and the electron multiplying unit 30.

As illustrated in FIG. 2, the substrate 21 includes a pair of principal surfaces 21a and 21b opposite to each other. The meta-surface 50 is provided on the principal surface 21a. For example, in a case in which the principal surface 21a configures a first principal surface, the principal surface 21b configures a second principal surface. The principal surface 21a and the principal surface 21b are disposed in parallel to the window 11a.

Figure 3:
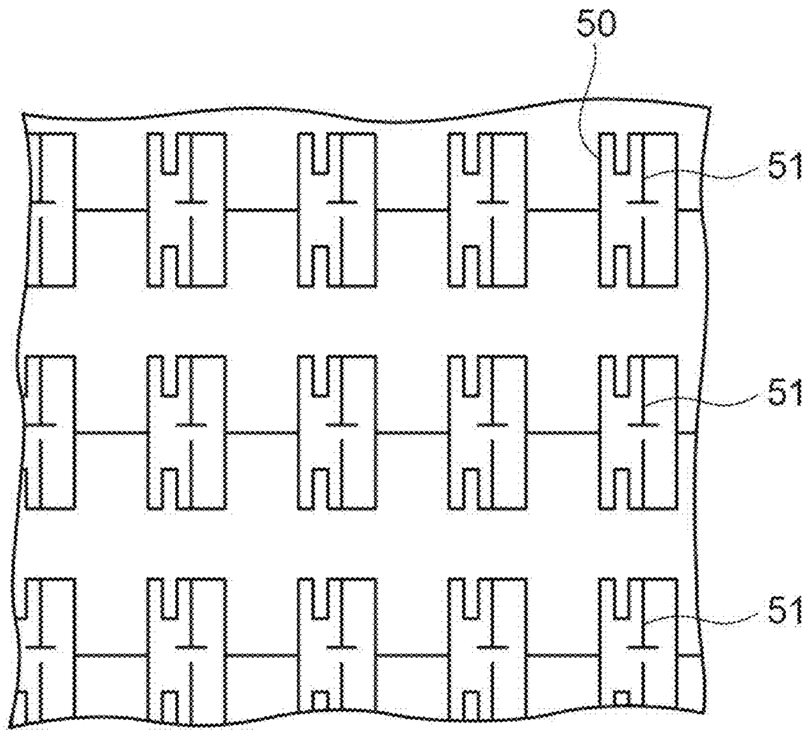
FIG. 3 is a partially enlarged view of a meta-surface.

The meta-surface 50 is included in an oxide layer or a metal layer patterned on the principal surface 21a of the substrate 21. The oxide layer is, for example, titanium oxide. The metal layer is, for example, gold. The meta-surface 50 has a rectangular shape in plan view. FIG. 3 is a partially enlarged view illustrating an example of the meta-surface. In the embodiment, as illustrated in FIG. 3, the metal layer included in the passive meta-surface 50 forms a plurality of antennas 51 on the principal surface 21a.

The antenna 51 having a smaller size is sensitive to an electromagnetic wave having a shorter wavelength, that is, an electromagnetic wave having a larger frequency. According to the change of a structure of the antenna 51, the meta-surface 50 corresponds to a frequency band of about 0.01 to 150 THz, that is, a frequency band from a so-called millimeter wave to near-infrared light. The meta-surface 50 may be configured to correspond to a frequency band of 0.01 to 10 THz equivalent to the frequency band from a so-called millimeter wave to a terahertz-wave, for example. The meta-surface 50 may be configured to correspond to a frequency band of 10 to 150 THz equivalent to a frequency band from a terahertz-wave to near-infrared light, for example. In the embodiment, a size of the meta-surface 50 in plan view is 10×10 mm A pitch of each antenna 51 is about 70 μm to 100 μm. The meta-surface 50 corresponds to an electromagnetic wave having a frequency of 0.5 THz.

In the embodiment, the meta-surface 50 is a transmissive meta-surface. In the transmissive meta-surface, when the electromagnetic wave is incident, the electron is emitted from the side opposite to the surface on which the electromagnetic wave has been incident. In the electron tube 1, the electromagnetic wave passed through the window 11a is incident on the principal surface 21b of the substrate 21. The electromagnetic wave passed through the substrate 21 is incident on the meta-surface 50 provided on the principal surface 21a. The meta-surface 50 emits the electron in response to the electromagnetic wave incident thereon after passing through the window 11a and the substrate 21.

The electron multiplying unit 30 is disposed in the housing 10 and includes an incidence surface 35 on which the electron emitted from the electron emitting unit 20 is incident. The electron multiplying unit 30 multiplies the electron having incident on the incidence surface 35. In the embodiment, the principal surface 21a of the substrate 21 faces the incidence surface 35 of the electron multiplying unit 30. That is, the meta-surface 50 faces the incidence surface 35 of the electron multiplying unit 30 and the electron emitted from the meta-surface 50 is incident on the incidence surface 35. The principal surface 21b of the substrate 21 faces the window 11a of the housing 10.

In the present specification, "α faces β" means that β is located in a normal direction of a rather than a plane contacting α. In other words, "α faces β" means that, when a space is bisected by a surface contacting α, β is located at the α side, not the back side of α. For example, in the electron tube 1, as described above, the meta-surface 50 faces the incidence surface 35 of the electron multiplying unit 30. This means that the incidence surface 35 of the electron multiplying unit 30 is located in a normal direction of the meta-surface 50 rather than a plane contacting the meta-surface 50.

Figure 4:
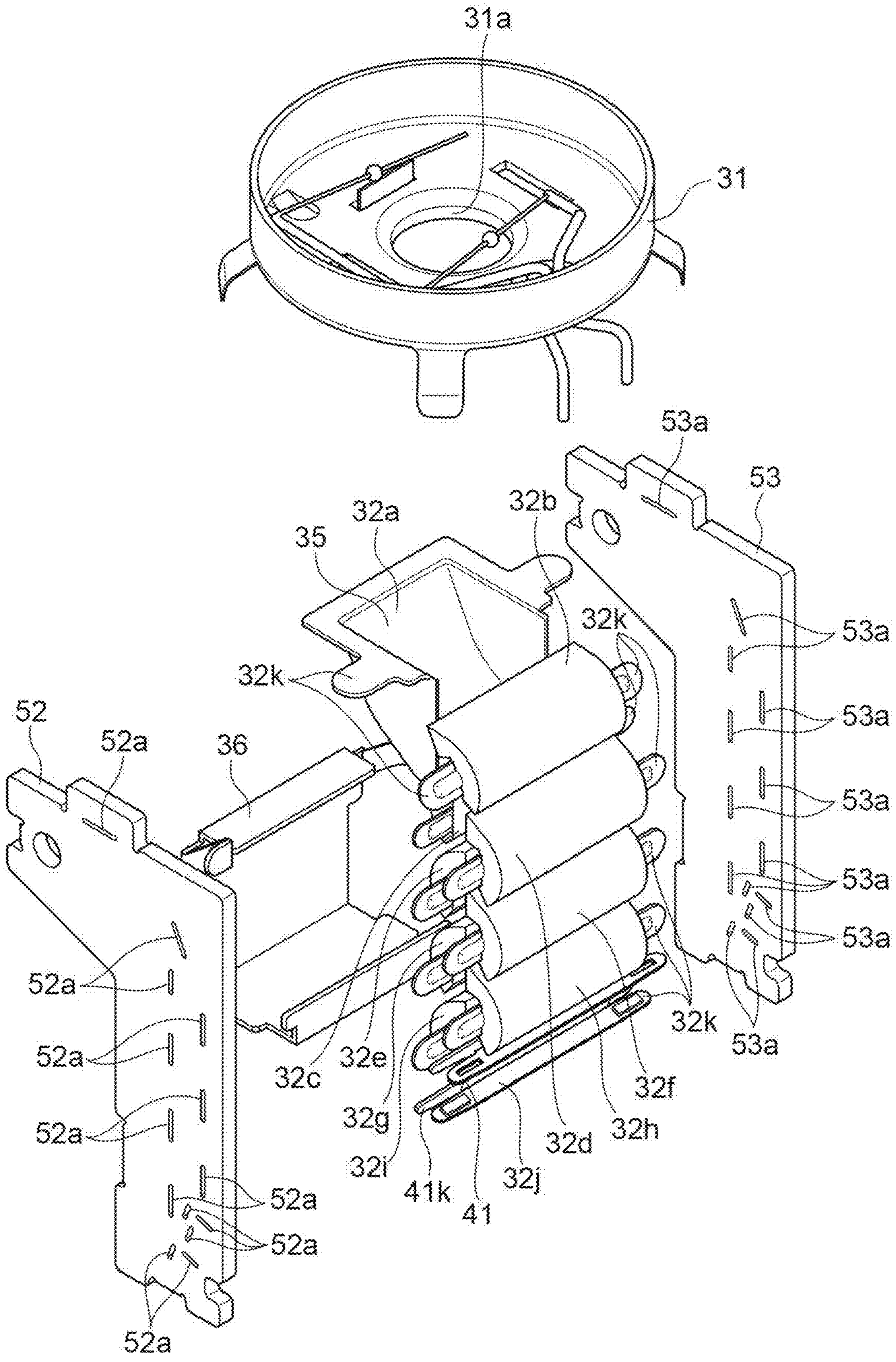
FIG. 4 is a partially exploded view of the electron tube.

In the embodiment, as illustrated in FIGS. 1 and 4, the electron multiplying unit 30 includes so-called linear-focused multistage dynodes. FIG. 4 illustrates a partially exploded view of the electron multiplying unit 30 and the electron collecting unit 40.

In the embodiment, the electron multiplying unit 30 includes a focusing electrode 31 arranged to converge electrons, and a plurality of stages of dynodes 32a, 32b, 32c, 32d, 32e, 32f, 32g, 32h, 32i, and 32j spaced away from each other. The dynode 32a includes the incidence surface 35 described above. In the embodiment, the electron multiplying unit 30 includes the ten stages of dynodes 32a to 32j. In a center portion of the focusing electrode 31, a circular incidence opening 31a is provided. The dynodes 32a to 32j are disposed at a rear stage of the incidence opening 31a. One of the plurality of wires 13 is connected to each of the dynodes 32a to 32j. Predetermined potentials are applied to each of the dynodes 32a to 32j through the wires 13. The dynodes 32a to 32j multiply the electron passed through the incidence opening 31a according to the applied potentials.

The electron collecting unit 40 is disposed in the housing 10 and collects the electrons multiplied by the electron multiplying unit 30. In the embodiment, the electron collecting unit 40 includes a mesh-like anode 41. The anode 41 opposes the principal surface 21b of the substrate 21. One of the plurality of wires 13 is connected to the anode 41. A predetermined potential is applied to the anode 41 through the wire 13. The anode 41 catches the electrons multiplied by the dynodes 32a to 32j. The electron collecting unit 40 may include a diode instead of the anode 41.

In the embodiment, the electron tube 1 includes insulating substrates 52 and 53. The dynodes 32a to 32j are secured to the substrates 52 and 53 inside the housing 10. The insulating substrates 52 and 53 are made of alumina. The insulating substrates 52 and 53 oppose each other. The dynodes 32a to 32j include a pair of ends 32k extending in a direction where the insulating substrates 52 and 53 oppose each other. The anode 41 includes a pair of ends 41k extending in the direction where the insulating substrates 52 and 53 oppose each other. The ends 32k and 41k of the dynodes 32a to 32j and the anode 41 are inserted into slit-like through-holes 52a and 53a provided in the insulating substrates 52 and 53.

The electron tube 1 includes a shielding plate 36. The shielding plate 36 surrounds a part of the dynodes 32a to 32j and the anode 41. The shielding plate 36 prevents light and ions generated by the collision of the electrons multiplied by the dynodes 32a to 32j from being scattered in the housing 10. The shielding plate 36 is connected to one of the plurality of wires 13. A predetermined potential is applied to the shielding plate 36 through the wire 13.

Next, an operation of the electron tube 1 when the electromagnetic wave has been incident will be described. After the electromagnetic wave passes through the window

11*a* of the housing 10, the electromagnetic wave is incident on the principal surface 21*b* of the substrate 21. The electromagnetic wave having incident on the principal surface 21*b* passes through the substrate 21 and is incident on the meta-surface 50 provided on the principal surface 21*a* of the substrate 21. The meta-surface 50 emits the electron in response to the incidence of the electromagnetic wave. The electron is emitted to the incidence surface 35 of the electron multiplying unit 30.

The electrons emitted from the meta-surface 50 are converged by the focusing electrode 31 and are sent to the first stage dynode 32*a*. When the electron is incident on the first stage dynode 32*a*, secondary electrons are emitted from the dynode 32*a* to the second stage dynode 32*b*. When the electrons are incident on the second stage dynode 32*b*, the secondary electrons are emitted from the dynode 32*b* to the third stage dynode 32*c*. As such, the electrons are successively sent while being multiplied from the first stage dynode 32*a* to the tenth stage dynode 32*j*. That is, for the electron emitted from the meta-surface 50, cascade multiplication is performed by the electron multiplying unit 30. The electrons multiplied by the electron multiplying unit 30 are collected by the anode 41, and are output as output signals from the anode 41 through the wire 13. For example, the first stage dynode 32*a* constitutes incidence surface 35.

Figure 5:
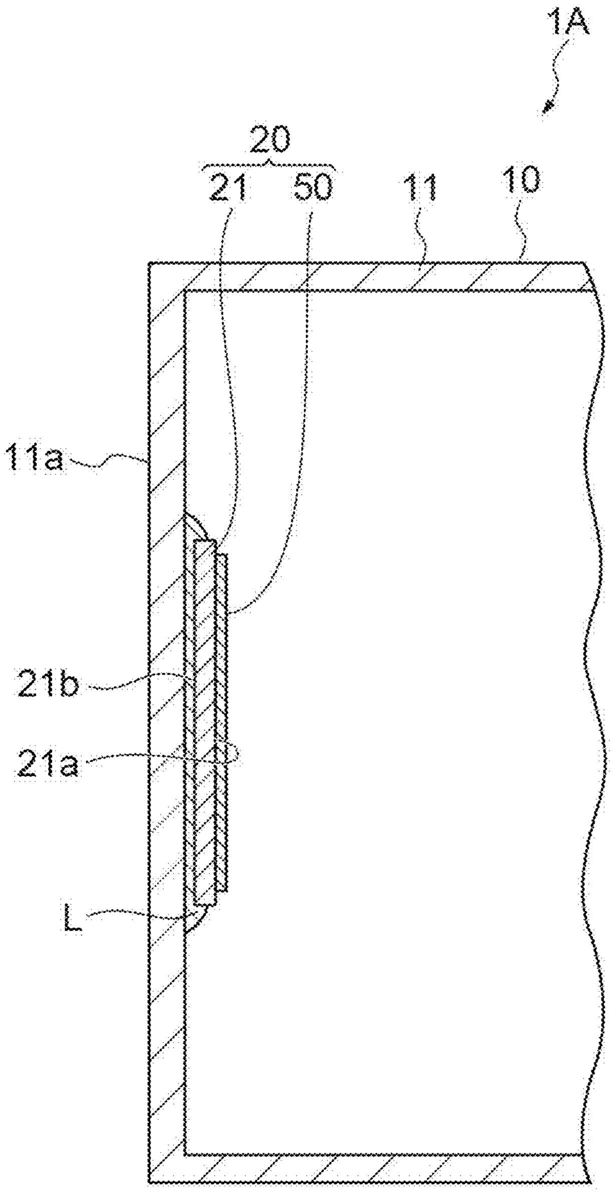
FIG. 5 is a partially enlarged view of an electron tube according to a modification of the embodiment.
Figure 6:
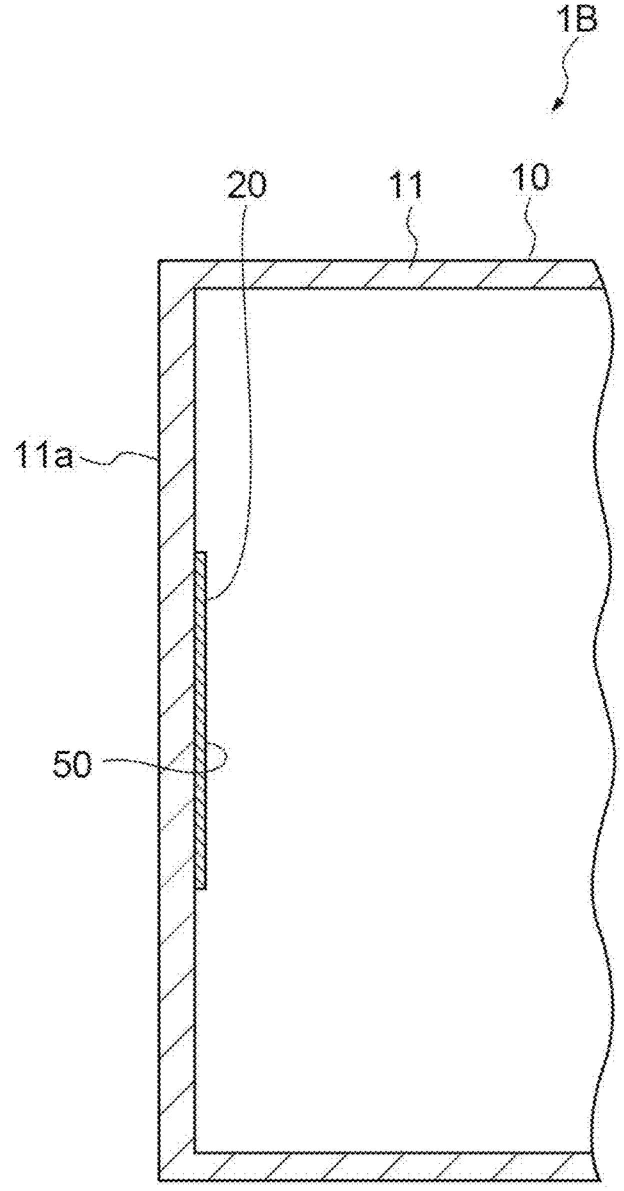
FIG. 6 is a partially enlarged view of an electron tube according to a modification of the embodiment.

Next, electron tubes according to modifications of the embodiment will be described with reference to FIGS. 5 and 6. FIGS. 5 and 6 illustrate partially enlarged views of the electron tubes according to the modifications.

The modification illustrated in FIG. 5 is generally similar to or the same as the embodiment described above. However, the modification is different from the embodiment in that the substrate 21 is provided on the window 11*a*. Hereinafter, a difference between the embodiment and the modification will be mainly described.

In an electron tube 1A illustrated in FIG. 5, the meta-surface 50 is provided indirectly on the window 11*a* in such a matter that the substrate 21 is located between the window 11*a* and the meta-surface 50 in the housing 10. The substrate 21 is provided on the window 11*a* in the housing 10. The substrate 21 has transparency for the electromagnetic wave passing through the window 11*a*. That is, the substrate 21 transmits at least a partial frequency band of the electromagnetic wave passed through the window 11*a*. The substrate 21 is made of, for example, silicon. The substrate 21 has a rectangular shape in plan view. The substrate 21 is separated from the window 11*a* and the electron multiplying unit 30.

The substrate 21 includes the principal surface 21*a* provided with the meta-surface 50 and the principal surface 21*b* opposite to the principal surface 21*a*. The principal surface 21*a* faces the incidence surface 35 of the electron multiplying unit 30. That is, the meta-surface 50 faces the electron multiplying unit 30. The principal surface 21*b* faces the window 11*a* of the housing 10. The principal surface 21*a* and the principal surface 21*b* are disposed in parallel to the window 11*a*. The principal surface 21*b* of the substrate 21 and the window 11*a* are adhered by an adhesive L for a vacuum. The adhesive L has transparency for the electromagnetic wave passing through the window 11*a*. The adhesive L for the vacuum is, for example, a polyethylene resin or epoxy resin adhesive. For example, in a case in which the principal surface 21*a* constitutes a first principal surface, the principal surface 21*b* constitutes a second principal surface.

In the electron tube 1A illustrated in FIG. 5, the electromagnetic wave passed through the window 11*a* is incident on the principal surface 21*b* of the substrate 21. The electromagnetic wave having incident on the principal surface 21*b* of the substrate 21 passes through the substrate 21 and is incident on the meta-surface 50 provided on the principal surface 21*a*. When the terahertz-wave is incident on the meta-surface 50, the meta-surface 50 emits the electron. The electron is emitted from the meta-surface 50 to the incidence surface 35 of the electron multiplying unit 30.

The modification illustrated in FIG. 6 is generally similar to or the same as the embodiment described above. However, the modification is different from the embodiment in that the meta-surface 50 is provided directly on the window 11*a* without locating the substrate between the meta-surface and the window 11*a*, in the housing 10. Hereinafter, a difference between the embodiment and the modification will be mainly described.

In an electron tube 1B illustrated in FIG. 6, the meta-surface 50 faces the incidence surface 35 of the electron multiplying unit 30. In the electron tube 1B illustrated in FIG. 6, the electromagnetic wave passed through the window 11*a* is incident on the meta-surface 50 provided on the window 11*a*, and the electron is emitted from the meta-surface 50. The electron is emitted from the meta-surface 50 to the incidence surface 35 of the electron multiplying unit 30.

Figure 7:
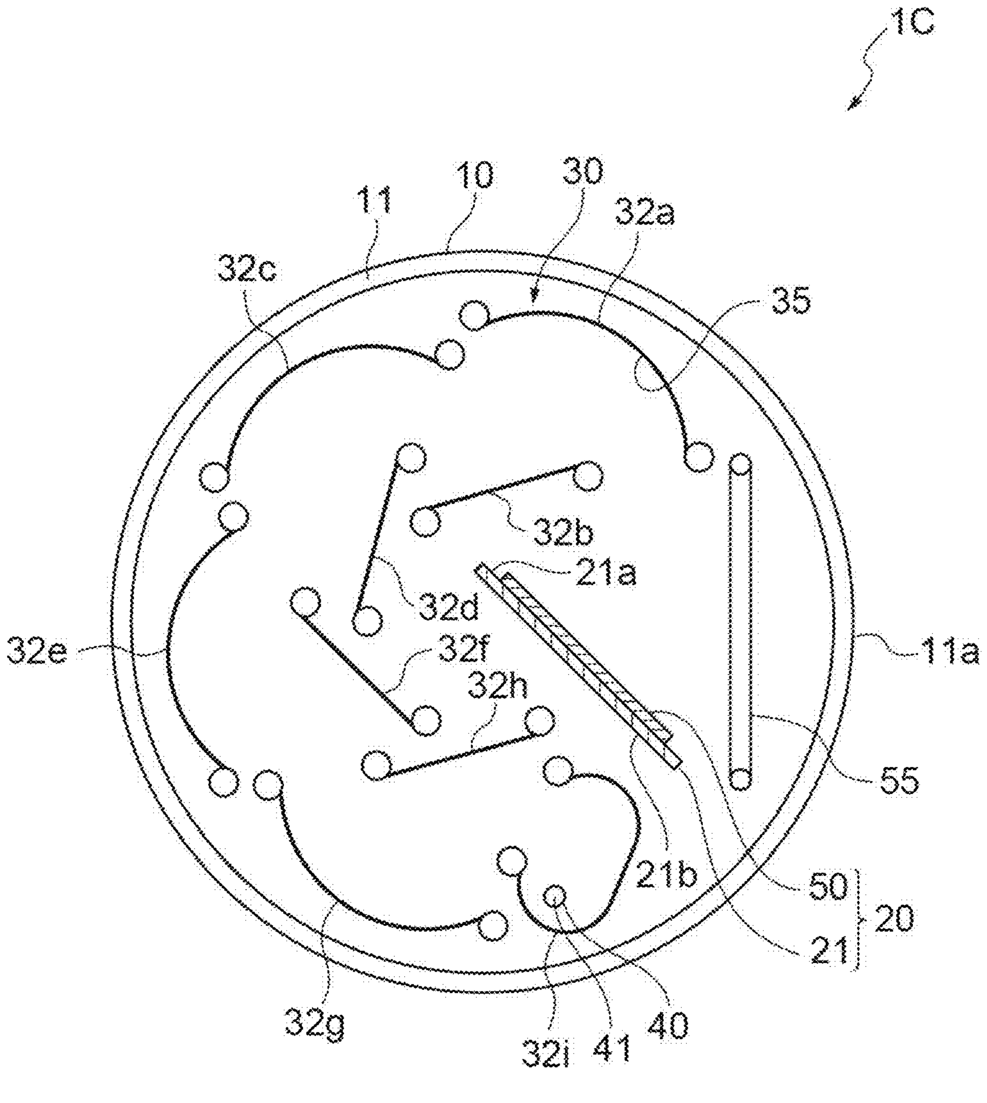
FIG. 7 is a partially enlarged view of an electron tube according to a modification of the embodiment.

Next, an electron tube according to a modification of the embodiment will be described with reference to FIG. 7. FIG. 7 is a cross-sectional view illustrating an example of the electron tube. The modification illustrated in FIG. 7 is generally similar to or the same as the embodiment described above. However, the modification is different from the embodiment in that the window 11*a* is provided on a side surface of the housing 10, an incidence direction of the electromagnetic wave to the meta-surface 50 is different, and the electron multiplying unit 30 includes so-called circular-cage multistage dynodes. Hereinafter, a difference between the embodiment and the modification will be mainly described.

In an electron tube 1C illustrated in FIG. 7, the window 11*a* is provided on the side surface of the cylindrical housing 10. In the electron tube 1C, the principal surface 21*a* of the substrate 21 faces the window 11*a* and the incidence surface 35 of the electron multiplying unit 30. That is, the meta-surface 50 provided in the principal surface 21*a* faces the window 11*a* and the incidence surface 35 of the electron multiplying unit 30.

In the electron tube 1C, the meta-surface 50 of the electron emitting unit 20 is a reflective meta-surface. In the reflective meta-surface, when the electromagnetic wave is incident, the electron is emitted to the side of the surface on which the electromagnetic wave has been incident. In the electron tube 1C, the electromagnetic wave passed through the window 11*a* is incident on the meta-surface 50 provided on the principal surface 21*a* of the substrate 21 without passing through the substrate 21. The meta-surface 50 emits the electron in response to the electromagnetic wave incident thereon after passing through the window 11*a*.

The electron tube 1C includes a grid 55 between the meta-surface 50 and the window 11*a*. The electromagnetic wave passed through the window 11*a* passes through the grid 55 and is incident on the meta-surface 50. A voltage is applied to the grid 55 through the wire 13. Due to an influence of an electric field caused by the grid 55, the electron emitted from the meta-surface 50 is guided to the incidence surface 35 of the electron multiplying unit 30.

The electron multiplying unit 30 of the electron tube 1C includes so-called circular-cage multistage dynodes 32*a*, 32*b*, 32*c*, 32*d*, 32*e*, 32*f*, 32*g*, 32*h*, and 32*i*. The dynode 32*a* includes the incidence surface 35. In this modification, the electron multiplying unit 30 includes the nine stages of the dynodes 32*a* to 32*i*. The dynodes 32*a* to 32*i* are provided around the electron emitting unit 20 along the side surface of the housing 10. A predetermined potential is applied to each of the dynodes 32*a* to 32*i* through the wire 13. The dynodes 32*a* to 32*i* multiply the incident electron according to the applied potential.

The electron collecting unit 40 of the electron tube 1C is surrounded by the curved dynode 32*i*. In this modification, the electron collecting unit 40 is the anode 41. One of the plurality of wires 13 is connected to the anode 41. A predetermined potential is applied to the anode 41 through the wire 13. The anode 41 catches the electrons multiplied by the dynodes 32*a* to 32*i*.

In the electron tube 1C illustrated in FIG. 7, if the electromagnetic wave passes through the window 11*a* of the housing 10, the electromagnetic wave passes through the grid 55 and is incident on the meta-surface 50 provided on the principal surface 21*a* of the substrate 21. The meta-surface 50 emits the electron in response to the incidence of the electromagnetic wave. The electron emitted from the meta-surface 50 is emitted to the incidence surface 35 of the electron multiplying unit 30 by the influence of the electric field caused by the grid 55.

The electron emitted from the meta-surface 50 is sent to the first stage dynode 32*a*. When the electron is incident on the first stage dynode 32*a* (incidence surface 35), secondary electrons are emitted from the dynode 32*a* to the second stage dynode 32*b*. When the electrons are incident on the second stage dynode 32*b*, the secondary electrons are emitted from the dynode 32*b* to the third stage dynode 32*c*. As such, the electrons are successively sent to go around the substrate 21 while being multiplied from the first stage dynode 32*a* to the ninth stage dynode 32*i*. The electrons multiplied by the electron multiplying unit 30 are collected by the anode 41, and are output as output signals from the anode 41 through the wire 13.

Figure 8:
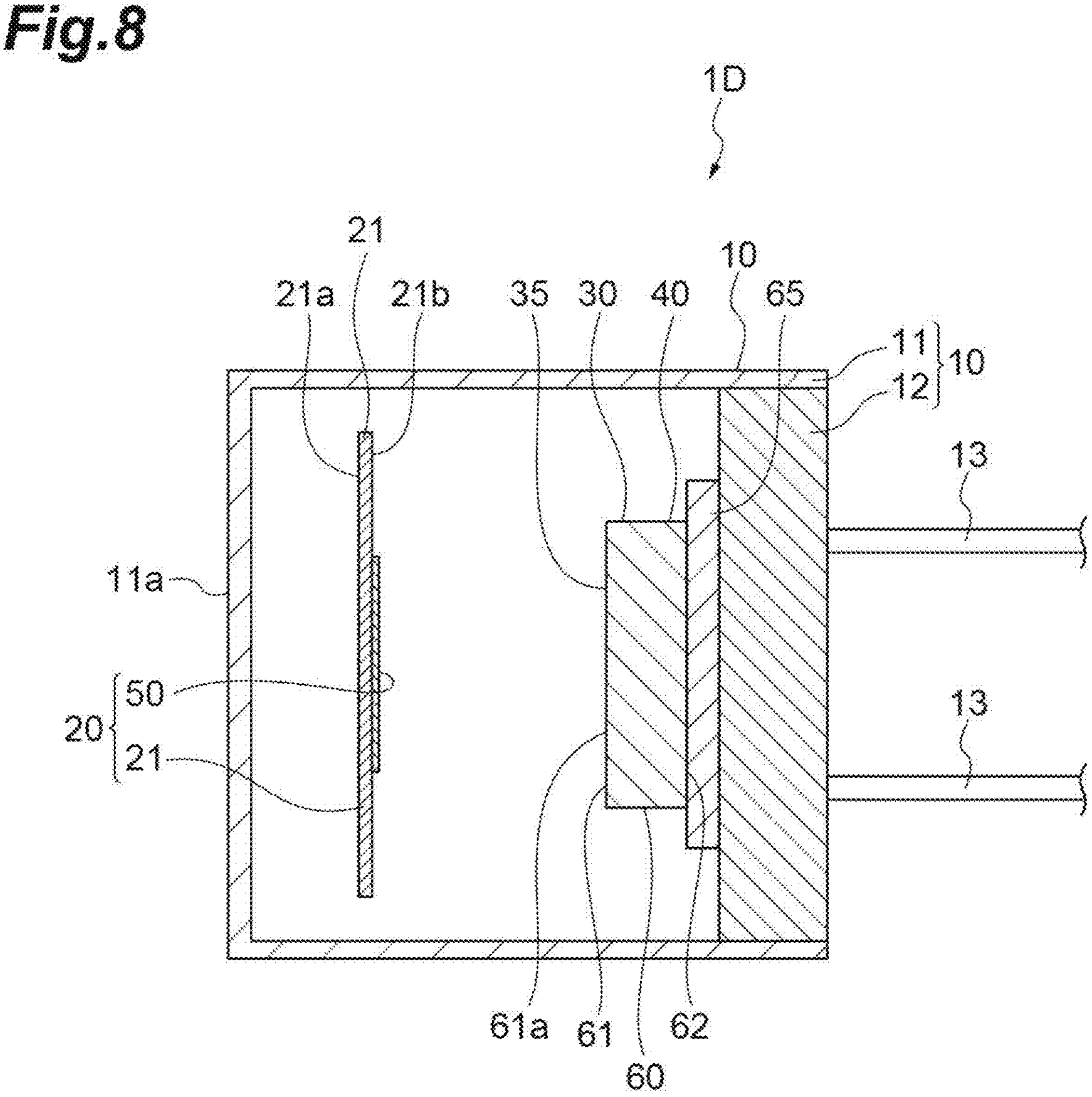
FIG. 8 is a cross-sectional view of an electron tube according to a modification of the embodiment.

Next, an electron tube according to a modification of the embodiment will be described with reference to FIG. 8. FIG. 8 is a cross-sectional view illustrating an example of the electron tube. The modification illustrated in FIG. 8 is generally similar to or the same as the embodiment described above. However, the modification is different from the embodiment in that the electron multiplying unit 30 and the electron collecting unit 40 are integrally configured as a diode 60. Hereinafter, a difference between the embodiment and the modification will be mainly described.

In an electron tube 1D illustrated in FIG. 8, the electron multiplying unit 30 and the electron collecting unit 40 are the diode 60. In the electron tube 1D, the electron multiplying unit 30 and the electron collecting unit 40 are integrally configured. In the electron tube 1D, the meta-surface 50 faces the window 11*a*.

In this modification, the diode 60 is an avalanche diode. The diode 60 has a rectangular shape in plan view and includes a pair of principal surfaces 61 and 62 opposite to each other. The principal surface 61 includes an electron incidence surface 61*a*. The principal surface 61 faces the window 11*a* of the housing 10. The principal surface 62 faces the stem 12 of the housing 10. The principal surfaces 61 and 62 are disposed in parallel to the window 11*a*, the substrate 21, and the meta-surface 50.

The principal surface 62 of the diode 60 is provided with an insulating layer 65. The diode 60 is connected to the stem 12 in such a matter that the insulating layer 65 is located between the diode 60 and the stem 12. One of the plurality of wires 13 is connected to each of the principal surface 61 and the principal surface 62.

A reverse bias voltage is applied to the diode 60 through the wire 13. In this modification, the reverse bias voltage higher than a breakdown voltage is applied between the side of the principal surface 61 of the diode 60 and the side of the principal surface 62 of the diode 60. In the electron tube 1D, when the electron emitted from the meta-surface 50 of the substrate 21 is incident on the electron incidence surface 61*a* of the diode 60, the incident electron is multiplied by avalanche multiplication in the diode 60. The multiplied electrons are output as output signals through the wire 13. For example, the principal surface 61 constitutes the electron incidence surface 61*a*.

Figure 9:
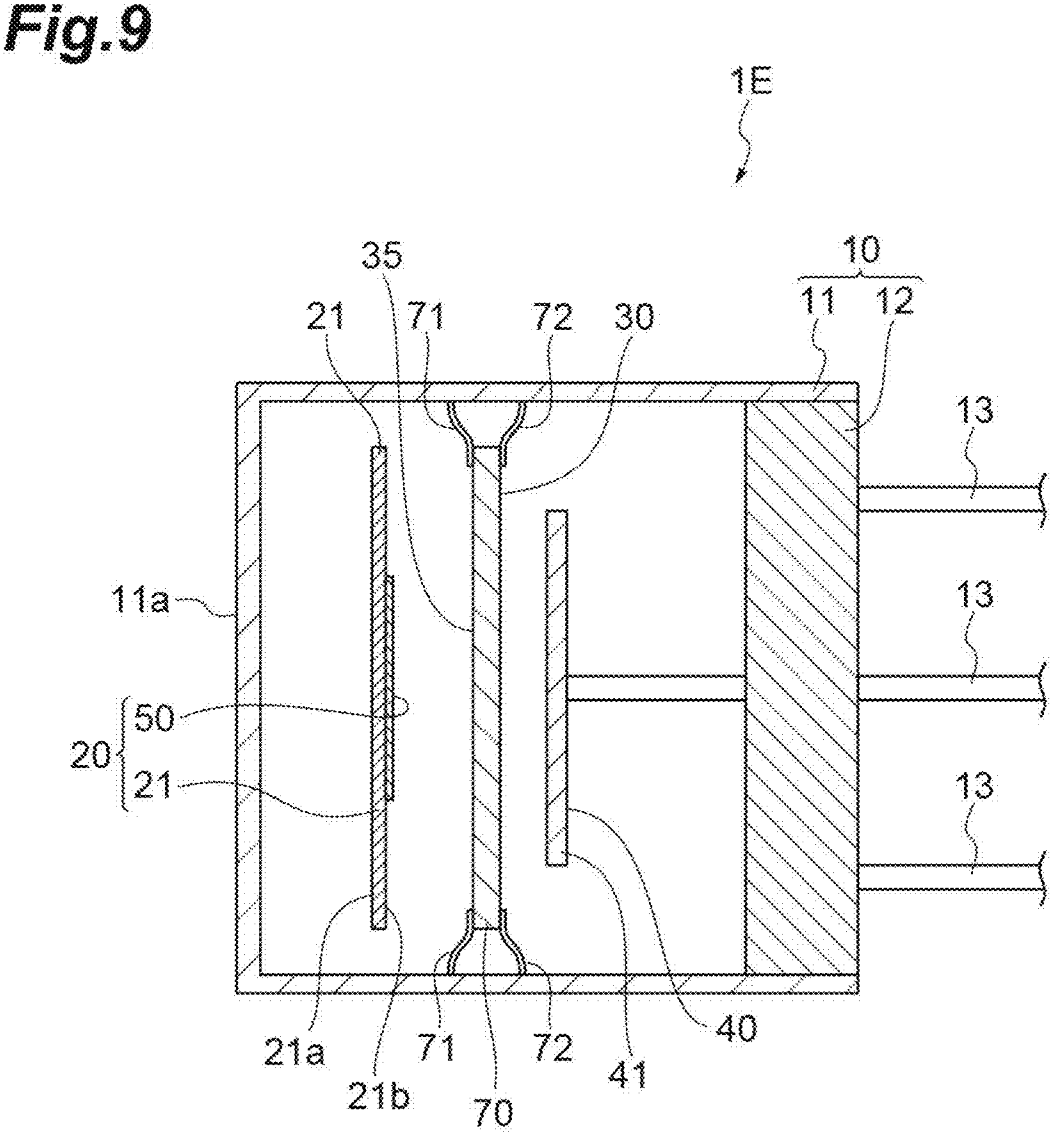
FIG. 9 is a cross-sectional view of an electron tube according to a modification of the embodiment.

Next, an electron tube according to a modification of the embodiment will be described with reference to FIGS. 9 and 10. FIG. 9 is a cross-sectional view illustrating an example of the electron tube. The modification illustrated in FIG. 9 is generally similar to or the same as the embodiment described above. However, the modification is different from the embodiment in that the electron multiplying unit 30 includes a microchannel plate 70 instead of the focusing electrode 31 and the dynodes 32*a* to 32*j*. Hereinafter, a difference between the embodiment and the modification will be mainly described.

In an electron tube 1E illustrated in FIG. 9, the microchannel plate 70 is supported by inner edges of attachment members 71 and 72 fixed to an inner wall of the valve 11. The microchannel plate 70 is disposed between the electron emitting unit 20 and the electron collecting unit 40. The microchannel plate 70 is disposed between the substrate 21 provided with the meta-surface 50 and the anode 41. The microchannel plate 70 is separated from the substrate 21 and the anode 41. Even in the electron tube 1E, the electron collecting unit 40 may include a diode instead of the anode 41.

Figure 10:
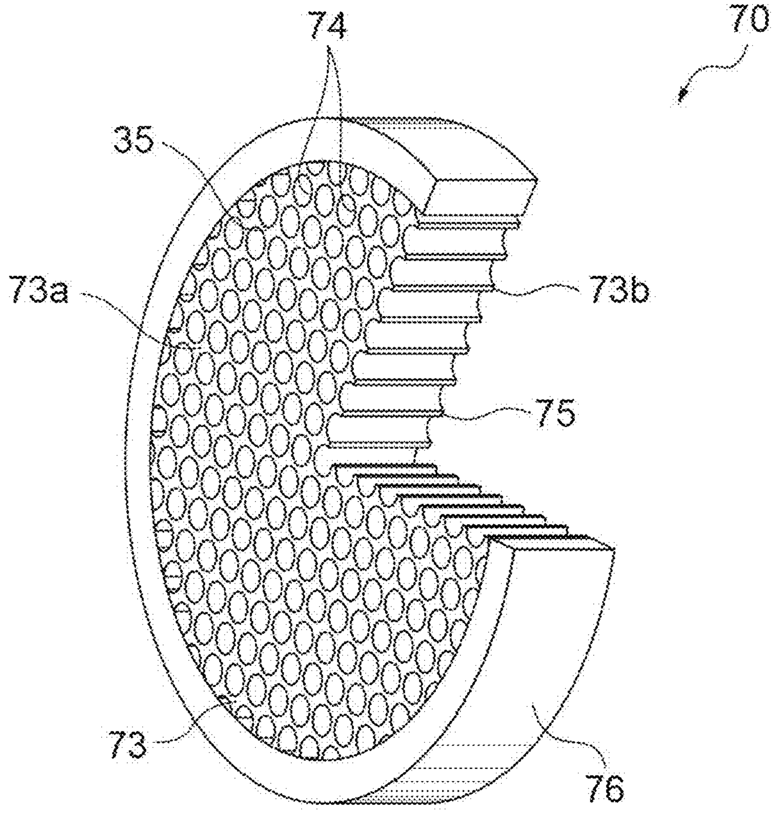
FIG. 10 is a perspective cutaway view of a microchannel plate.

FIG. 10 is a perspective cutaway view of an example of the microchannel plate. In this modification, the microchannel plate 70 includes a base body 73, a plurality of channels 74, a partition wall portion 75, and a frame member 76, as illustrated in FIG. 10. The base body 73 includes an input surface 73*a* and an output surface 73*b* opposite to the input surface 73*a*. The base body 73 is formed in a disk shape. The input surface 73*a* faces the substrate 21. The output surface 73*b* faces the anode 41. The input surface 73*a* and the output surface 73*b* are disposed in parallel to the window 11*a*, the substrate 21, and the meta-surface 50. The anode 41 has a flat plate shape and is disposed in parallel to the output surface 73*b* of the microchannel plate 70.

The plurality of channels 74 are formed in the base body 73 from the input surface 73*a* to the output surface 73*b*. Specifically, each channel 74 extends from the input surface 73*a* to the output surface 73*b*, in a direction orthogonal to the input surface 73*a* and the output surface 73*b*. The plurality of channels 74 are disposed in a matrix shape in plan view. Each channel 74 has a circular cross-sectional shape. Between the plurality of channels 74, the partition wall portion 75 is provided. To function as an electron multiplier, the microchannel plate 70 includes a resistance layer and an electron emitting layer not illustrated in the drawings, on a surface of the partition wall portion 75 in the channels 74. The frame member 76 is provided on peripheral edge portions of the input surface 73*a* and output surface 73*b* of the base body 73.

In the electron tube 1E, one of the plurality of wires 13 is connected to each of the attachment members 71 and 72. In the microchannel plate 70, a voltage is applied to the input surface 73*a* and the output surface 73*b* through the wire 13 and the attachment members 71 and 72. Specifically, potentials are applied to the input surface 73*a* and the output surface 73*b* so that the output surface 73*b* has a higher potential than the input surface 73*a*.When the electron emitted from the meta-surface 50 is incident on the input surface 73*a*, the electron is multiplied by the channels 74 and are emitted from the output surface 73*b*. The electrons multiplied by the microchannel plate 70 are collected by the anode 41, and are output as output signals from the anode 41 through the wire 13.

Figure 11:
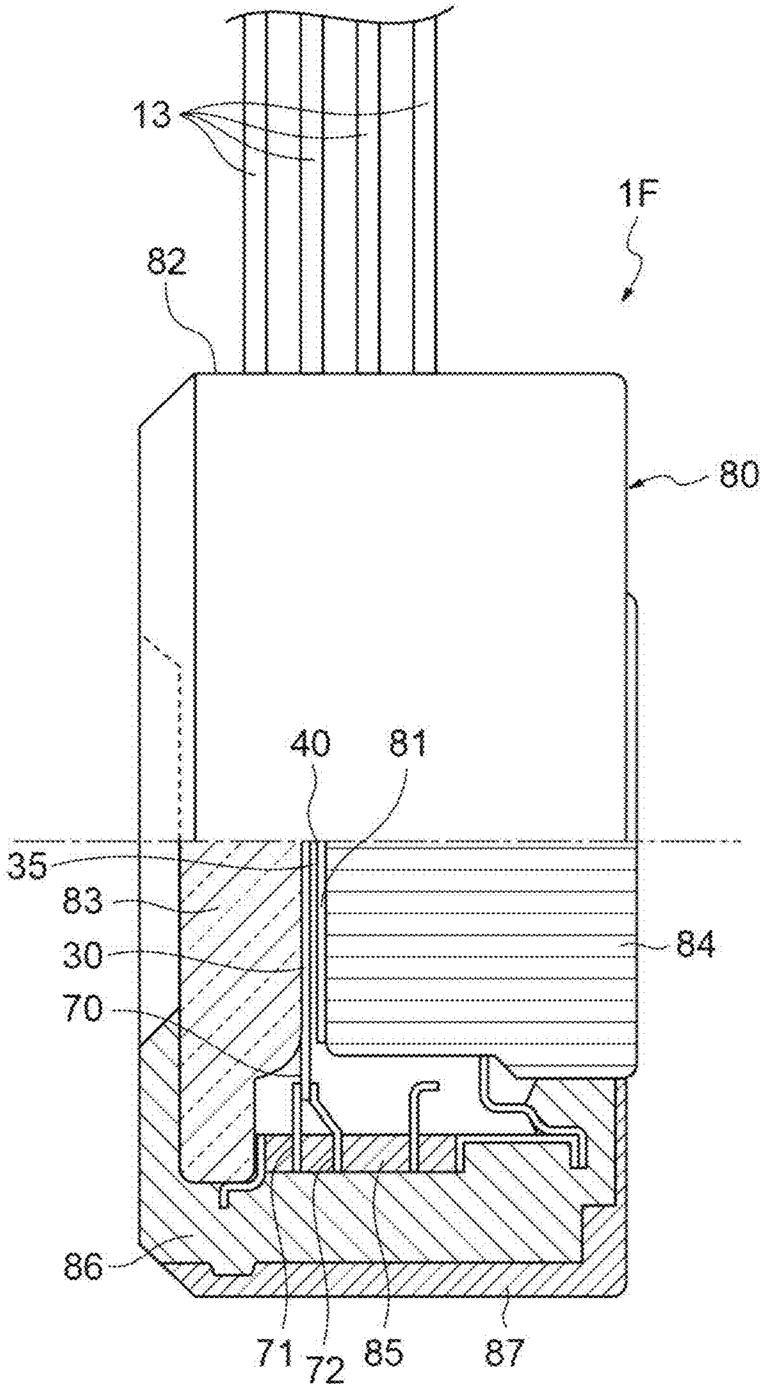
FIG. 11 is a partially cross-sectional view of an electron tube according to a modification of the embodiment.
Figure 12:
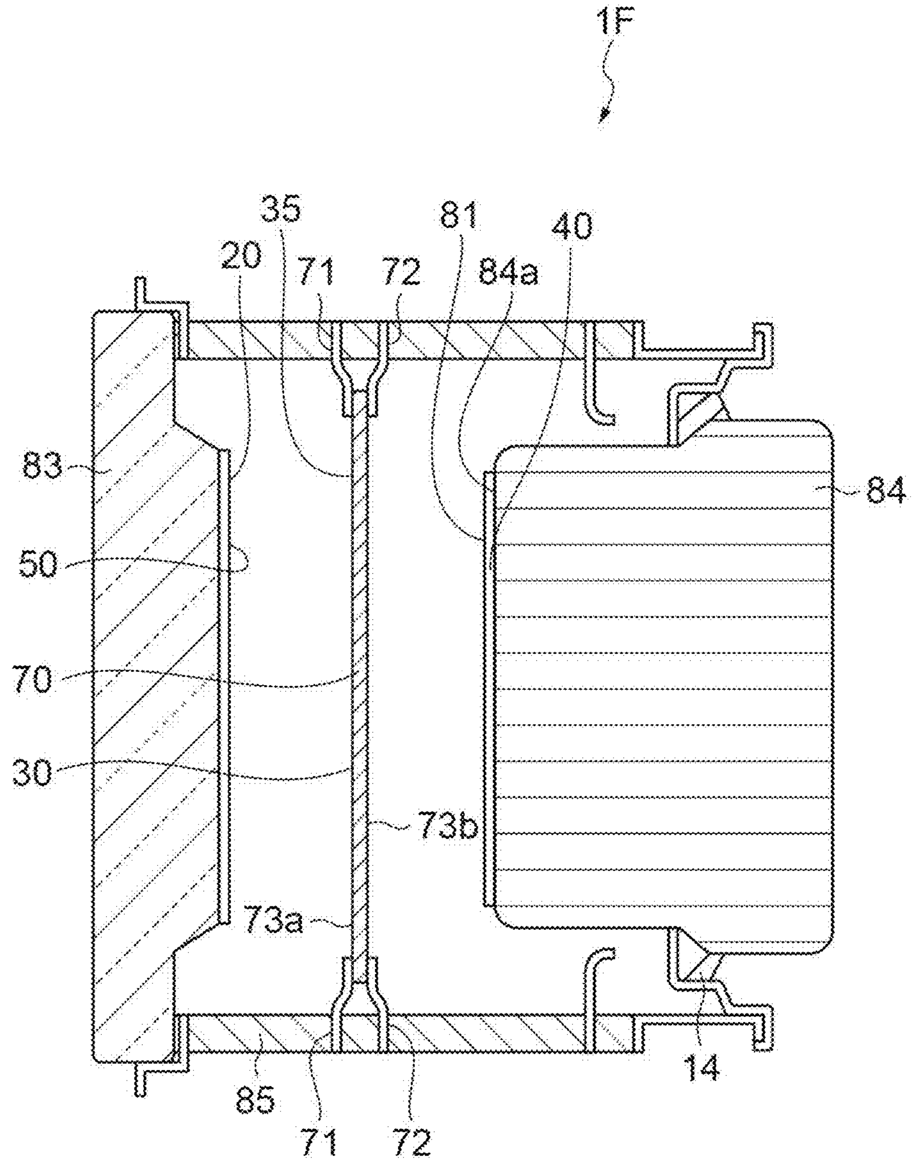
FIG. 12 is a cross-sectional view of an electron tube according to a modification of the embodiment.

Next, an electron tube according to a modification of the embodiment will be described with reference to FIGS. 11 and 12. FIG. 11 is a partial cross-sectional view illustrating an example of the electron tube. FIG. 12 is a cross-sectional view illustrating a part of the electron tube illustrated in FIG. 11. The modification illustrated in FIGS. 11 and 12 is generally similar to or the same as the embodiment described above. However, the modification is different from the embodiment in that the electron tube is a so-called image intensifier. Hereinafter, a difference between the embodiment and the modification will be mainly described.

In an electron tube 1F illustrated in FIG. 11, the electron emitting unit 20, the electron multiplying unit 30, and the electron collecting unit 40 are disposed in a housing 80. Similar to the electron tube 1E illustrated in FIG. 9, in the electron tube 1F, the electron multiplying unit 30 includes the microchannel plate 70 instead of the focusing electrode 31 and the dynodes 32*a* to 32*j*. In the electron tube 1F, the electron collecting unit 40 includes a fluorescent body 81 instead of the anode 41. In the electron tube 1F, the meta-surface 50, the microchannel plate 70, and the fluorescent body 81 are close to each other in the housing 80.

The housing 80 includes a sidewall 82, an incidence window 83 (window 11*a*), and an emission window 84. The sidewall 82 has a hollow cylindrical shape. Each of the incidence window 83 and the emission window 84 has a disk shape. An inner portion of the housing 80 is held in a vacuum by airtightly sealing both ends of the sidewall 82 with the incidence window 83 and the emission window 84. For example, the inner portion of the housing 80 is held at 1×10−5 to 1×10−7 Pa.

The sidewall 82 includes a side tube 85, a mold member 86 covering a side portion of the side tube 85, and a case member 87 covering a side portion and a bottom portion of the mold member 86, for example. Each of the side tube 85, the mold member 86, and the case member 87 has a hollow cylindrical shape. The side tube 85 is made of, for example, ceramic. The mold member 86 is made of, for example, silicone rubber. The case member 87 is made of, for example, ceramic.

A through-hole is formed in each of both ends of the mold member 86. One end of the case member 87 is opened. The other end of the case member 87 is provided with a through-hole. The through hole of the case member 87 includes an edge located to coincide with an edge position of one through-hole of the mold member 86. At one end of the mold member 86, the incidence window 83 is joined to a surface around the through-hole of the mold member 86. Similar to the window 11*a* of the electron tube 1, the incidence window 83 transmits an electromagnetic wave. Similar to the window 11*a* of the electron tube 1, the incidence window 83 includes at least one selected from quartz, silicon, germanium, sapphire, zinc selenide, zinc sulfide, magnesium fluoride, lithium fluoride, barium fluoride, calcium fluoride, magnesium oxide, and calcium carbonate.

In the electron tube 1F, the meta-surface 50 is provided directly on the incidence window 83 in the housing 80. The meta-surface 50 faces the microchannel plate 70. The microchannel plate 70 is disposed between the meta-surface 50 and the fluorescent body 81. The microchannel plate 70 is separated from the meta-surface 50 and the fluorescent body 81.

At the other end side of the mold member 86, the emission window 84 is fitted into the other through-hole of the mold member 86. The emission window 84 is, for example, a fiber plate configured by gathering a large number of optical fibers in a plate shape. Each optical fiber of the fiber plate is configured such that an end surface 84*a* of the inner side of the housing 80 flushes with each optical fiber. The end surface 84*a* is disposed in parallel to the meta-surface 50.

The fluorescent body 81 is disposed on the end face 84*a*. The fluorescent body 81 is formed by applying a fluorescent material to the end face 84*a*, for example. The fluorescent material is, for example, (ZnCd)S:Ag (zinc sulfide cadmium doped with silver). On the surface of the fluorescent body 81, a metal back layer and a low electron reflectance layer are sequentially stacked. For example, the metal back layer is formed by evaporation of A1, has relatively high reflectance for light passed through the microchannel plate 70, and has relatively high transmittance for the electrons emitted from the microchannel plate 70. The low electron reflectance layer is formed by evaporation of, for example, C (carbon), Be (beryllium), or the like, and has relatively low reflectance for the electrons emitted from the microchannel plate 70.

Similar to the electron tube 1E, in the electron tube 1F, one of the plurality of wires 13 extending to the outside of the housing 80 is connected to each of the attachment members 71 and 72 holding the microchannel plate 70. In the microchannel plate 70, a voltage is applied to the side of the input surface 73*a* and the side of the output surface 73*b* through the attachment members 71 and 72.

When the electron emitted from the meta-surface 50 is incident on the input surface 73*a*, the electron is multiplied by the channels 74 and are emitted from the output surface 73*b*. In the electron tube 1F, the electrons multiplied by the microchannel plate 70 are collected in the fluorescent body 81. The fluorescent body 81 receives the electrons multiplied by the microchannel plate 70 and emits light. The light emitted from the fluorescent body 81 passes through the fiber plate and is emitted from the emission window 84 to the outside of the housing 80.

Figure 13:
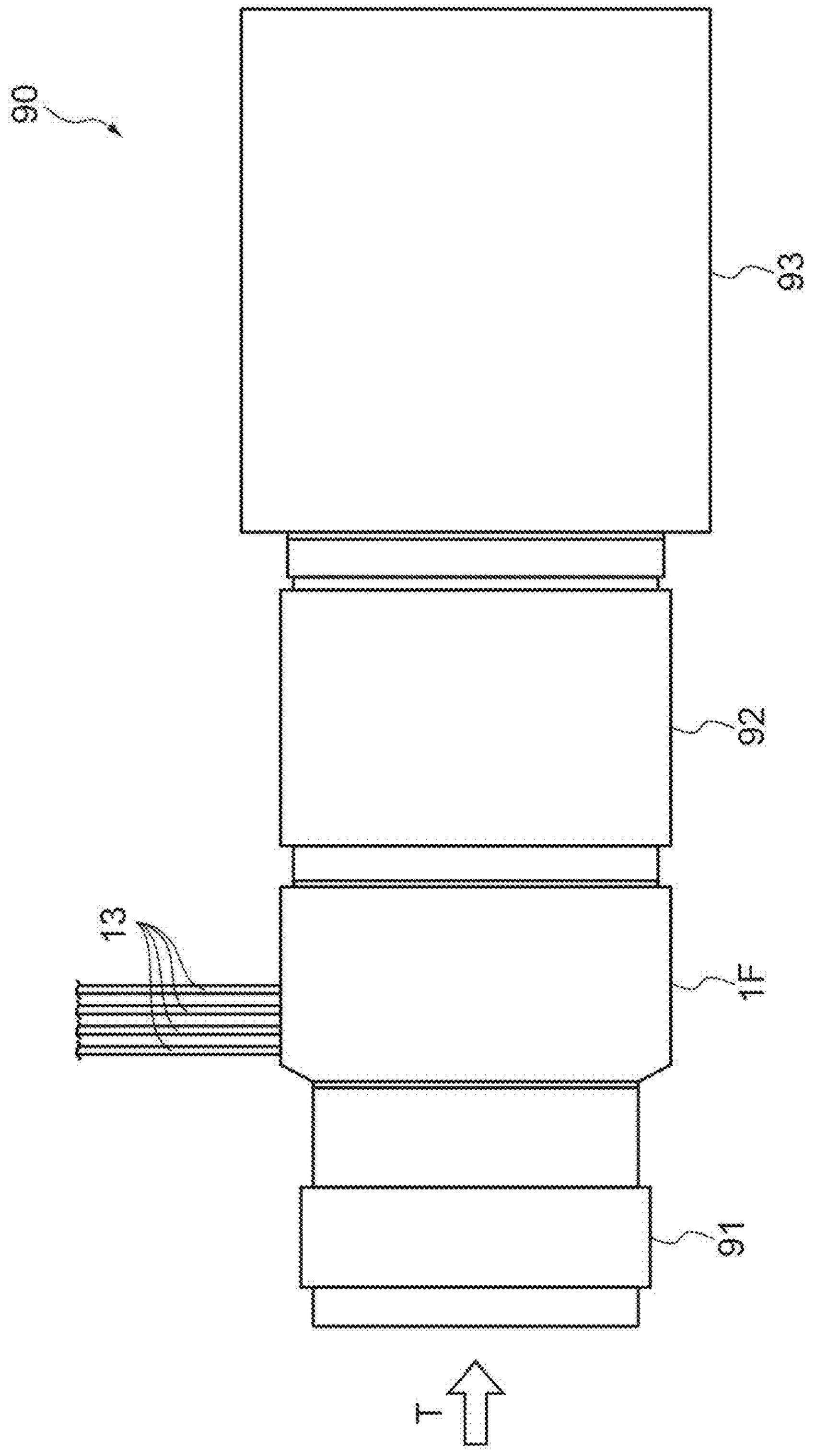
FIG. 13 is a side view of an imaging device according to a modification of the embodiment.

Next, an imaging device including an electron tube according to a modification of the embodiment will be described with reference to FIG. 13. FIG. 13 is a side view of the imaging device. An imaging device 90 illustrated in FIG. 13 acquires an image based on an electromagnetic wave emitted from an observation target or an electromagnetic wave reflected or scattered by the observation target. The imaging device 90 includes the electron tube 1F that is an image intensifier, an objective lens 91, a relay lens 92, and an imaging unit 93 as components. In the imaging device 90, the components are joined in the order of the objective lens 91, the electron tube 1F, the relay lens 92, and the imaging unit 93.

The objective lens 91 includes a lens having a refractive index in the electromagnetic wave incident on the electron tube 1F. The objective lens 91 guides an electromagnetic wave T from the observation target to the incidence window 83 of the electron tube 1F. The relay lens 92 guides the light emitted from the emission window 84 of the electron tube 1F to the imaging unit 93. The imaging unit 93 captures an image based on the light guided from the relay lens 92, that is, the light emitted from the fluorescent body 81. The imaging unit 93 is, for example, a CCD camera.

Figure 14:
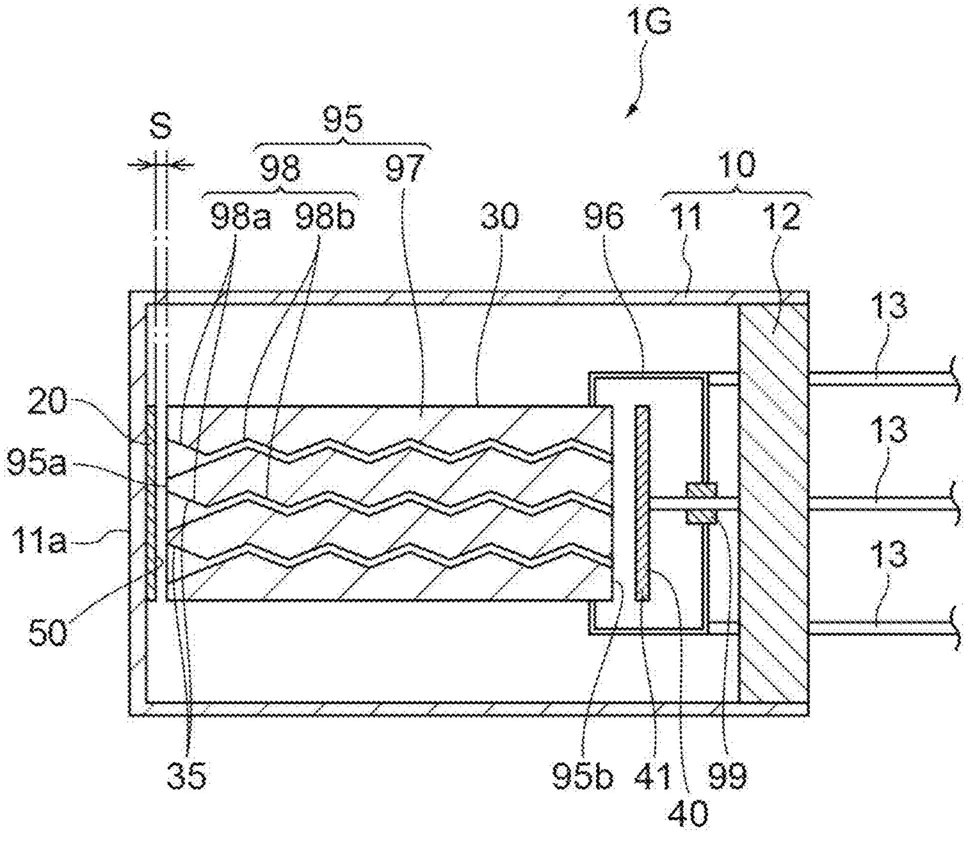
FIG. 14 is a cross-sectional view of an electron tube according to a modification of the embodiment.

Next, an electron tube according to a modification of the present embodiment will be described with reference to FIG. 14. FIG. 14 is a partially cross-sectional view illustrating an example of the electron tube. The modification illustrated in FIG. 14 is generally similar to or the same as the embodiment described above. However, the modification is different from the embodiment in that the electron multiplying unit 30 includes an electron multiplying body 95 instead of the focusing electrode 31 and the dynodes 32*a* to 32*j*. Hereinafter, a difference between the embodiment and the modification will be mainly described. The electron multiplying body 95 is a so-called channel electron multiplier (CEM).

In an electron tube 1G illustrated in FIG. 14, the electron multiplying body 95 is supported by a holding member 96 fixed to an inner wall of the valve 11. The electron multiplying body 95 is disposed between the electron emitting unit 20 and the electron collecting unit 40. Specifically, the microchannel plate 70 is disposed between the window 11*a* provided with the meta-surface 50 and the anode 41. The electron multiplying body 95 is separated from the window 11*a* and the anode 41. Even in the electron tube 1G, the electron collecting unit 40 may include a diode instead of the anode 41.

In this modification, the electron multiplying body 95 includes an input surface 95*a* and an output surface 95*b* opposite to the input surface 95*a*. The input surface 95*a* faces the window 11*a*. The output surface 95*b* faces the anode 41 arranged to constitute the electron collecting unit 40. The input surface 95*a* and the output surface 95*b* are disposed in parallel to the window 11*a* and the meta-surface 50. The anode 41 has a flat plate shape and is disposed in parallel to the output surface 95*b* of the electron multiplying body 95. In the embodiment, a distance S between the input surface 95*a* and the meta-surface 50 is, for example, 0.615 mm, in a direction orthogonal to the input surface 95*a*.

The electron multiplying body 95 includes a main body portion 97 and a plurality of channels 98. The main body portion 97 has a rectangular parallelepiped shape. The plurality of channels 98 are defined by the main body portion 97. Each channel 98 is formed from the input surface 95*a* to the output surface 95*b*. Specifically, each channel 98 extends from the input surface 95*a* to the output surface 95*b*, in a direction orthogonal to the input surface 95*a* and the output surface 95*b*. In the configuration illustrated in FIG. 14, three channels 98 are distributed in one direction parallel to the input surface 95*a*.

Each channel 98 includes an electron incidence portion 98*a* and a multiplication portion 98*b*. The electron incidence portion 98*a* of each channel 98 has an opening provided on the input surface 95*a*. The opening of the electron incidence portion 98*a* has a rectangular shape, seen from a direction orthogonal to the input surface 95*a*. The electron incidence portion 98*a* gradually narrows in an arrangement direction of the plurality of channels 98, from the input surface 95*a* to the output surface 95*b*. That is, the electron incidence portion 98*a* has a tapered shape the diameter of which decreases along the direction orthogonal to the input surface 95*a*.

The multiplication portion 98*b* of each channel 98 is formed in a zigzag shape or wave shape, seen from a direction parallel to the input surface 95*a* and orthogonal to an arrangement direction of the plurality of channels 98. In other words, the multiplication portion 98*b* has a shape repeating bends, in an arrangement direction of the plurality of channels 98.

In the electron tube 1G, two of the plurality of wires 13 are connected to the holding member 96. A voltage is applied to the electron multiplying body 95 through the wires 13 and the holding member 96. Specifically, potentials are applied to the input surface 95*a* and the output surface 95*b* so that the output surface 95*b* has a higher potential than the input surface 95*a*. A wire 13 different from the wires 13 connected to the holding member 96 is connected to the anode 41. The holding member 96 and the anode 41 are electrically insulated from each other, by an insulating member 99.

The electrons emitted from the meta-surface 50 enter the opening of the input surface 95*a* of any of the channels 98, and thereafter enter the multiplication portion 98*b* through the electron incidence portion 98*a*. As a result of this, the electrons emitted from the meta-surface 50 are multiplied by channels 98 and are emitted from the output surface 95*b*. The electrons multiplied by the electron multiplying body 95 are collected by the anode 41 arranged to constitute the electron collecting unit 40 and are output as output signals from the anode 41 through the wire 13.

As described above, in the electron tubes 1, 1A, 1B, 1C, 1D, 1E, and 1F, the window 11*a* that transmits the electromagnetic wave is provided in the housing 10. The window 11*a* includes at least one selected from quartz, silicon, germanium, sapphire, zinc selenide, zinc sulfide, magnesium fluoride, lithium fluoride, barium fluoride, calcium fluoride, magnesium oxide, and calcium carbonate. Therefore, it is possible to ensure the intensity of the electromagnetic wave guided into the housings 10 and 80, for example, an electromagnetic wave in a frequency band from a terahertz-wave to infrared light. When the electromagnetic wave passed through the window 11*a* is incident on the meta-surface 50 of the electron emitting unit 20, the electron is emitted. The emitted electron is multiplied by the electron multiplying unit 30 in the housings 10 and 80 and are then collected by the electron collecting unit 40. Therefore, detection accuracy is ensured for the electromagnetic wave having weak intensity.

In the electron tubes 1, 1A, 1B, 1D, 1E, and 1F, the electron emitting unit 20 includes the substrate 21 including the principal surface 21*a* provided with the meta-surface 50 and the principal surface 21*b* opposite to the principal surface 21*a*. The electron multiplying unit 30 includes the incidence surface 35 on which the electrons emitted from the electron emitting unit 20 are incident. The substrate 21 has transparency for the electromagnetic wave passing through the window 11*a*. The substrate 21 is disposed in such a manner that the principal surface 21*a* faces the incidence surface 35 of the electron multiplying unit 30 and the principal surface 21*b* faces the window 11*a*. In this case, in the configuration in which the electromagnetic wave passed through the window 11*a* and the substrate 21 is incident on the meta-surface 50, the electron emitted from the meta-surface 50 in response to the incidence of the electromagnetic wave is guided to the electron multiplying unit 30 with a simple configuration.

In the electron tubes 1B and 1F, the meta-surface 50 is provided on the window 11*a* to face the incidence surface 35 of the electron multiplying unit 30. According to this configuration, the substrate provided with the meta-surface 50 is not required in the housings 10 and 80. Therefore, a size and the weight of the electron tube can be reduced.

In the electron tube 1C, the substrate 21 is disposed such that the principal surface 21*a* faces the window 11*a* and the incidence surface 35 of the electron multiplying unit 30. In this case, in the configuration in which the electromagnetic wave passed through the window 11*a* is incident on the meta-surface 50 without passing through the substrate, the electron emitted from the meta-surface 50 in response to the incidence of the electromagnetic wave is guided to the electron multiplying unit 30 with a simple configuration.

The meta-surface 50 is included in a patterned oxide layer or a patterned metal layer. According to this configuration, the electrons emitted from the meta-surface 50 in response to the incidence of the electromagnetic wave increase.

In the electron tube 1D, the electron multiplying unit 30 and the electron collecting unit 40 are the diode 60 and are integrally configured. According to this configuration, a size of the electron tube can be further reduced.

In the electron tubes 1, 1A, and 1B, the electron multiplying unit 30 includes the plurality of dynodes 32*a* to 32*j* spaced away from each other. The electron collecting unit 40 includes the anode 41 or the diode arranged to collect electrons multiplied by the electron multiplying unit 30. According to this configuration, the electron emitted from the meta-surface 50 is multiplied by the plurality of dynodes 32*a* to 32*j*. Therefore, a multiplication factor of the electrons collected by the anode 41 or the diode is improved.

In the electron tube 1E, the electron multiplying unit 30 includes the microchannel plate 70. The electron collecting unit 40 includes the anode 41 or the diode arranged to collect electrons multiplied by the electron multiplying unit 30. According to this configuration, a size, a weight, and power consumption are reduced and a response speed and a gain are improved, as compared with the case where the plurality of dynodes are used for the electron multiplying unit 30.

In the electron tube 1F, the electron multiplying unit 30 includes the microchannel plate 70. The electron collecting unit 40 includes the fluorescent body 81 that receives the electrons multiplied by the electron multiplying unit 30 and emits light. According to this configuration, two-dimensional positions of the electron emitted from the meta-surface 50 can be detected by the light emitted from the fluorescent body 81.

The imaging device 90 includes the electron tube 1F and the imaging unit 93. The imaging unit 93 captures an image based on the light from the fluorescent body 81. According to this configuration, detection accuracy of the electromagnetic wave is ensured. An image illustrating the two-dimensional positions of electron emitted from the meta-surface 50 can be acquired.

Although the embodiment and the modifications of the present invention have been described, the present invention is not necessarily limited to the embodiment and the modification and various changes can be made without departing from the gist thereof.

In the electron tubes 1, 1A, 1B, 1C, 1E, 1F, and 1G, the meta-surface 50 may be a passive meta-surface or may be an active meta-surface. FIG. 3 illustrates a passive meta-surface 50. The electron emitting unit 20 including the passive meta-surface 50 arranged to operate without a bias voltage applied to each antenna 51 of the meta-surface 50. That is, the passive meta-surface 50 is a meta-surface arranged to emit electrons in response to the incidence of an electromagnetic wave in a state where each antenna 51 has a same potential.

The electron emitting unit 20 including the active meta-surface arranged to operate in a state where a bias voltage is applied to each antenna 51 of the meta-surface 50. That is, the active meta-surface 50 is a meta-surface arranged to emit electrons in response to the incidence of an electromagnetic wave in a state where a bias voltage is applied to each antenna. In this case, a voltage from any of the plurality of wires 13 is applied to the meta-surface 50.

In the electron tubes 1, 1A, 1B, 1C, 1E, and 1G, the electron collecting unit 40 may include a diode instead of the anode 41. In this case, the electrons multiplied by the electron multiplying unit 30 are collected by the diode.

In the electron tubes 1, 1A, and 1B, the window 11*a* may be provided on the side surfaces of the housings 10 and 80, as in the electron tube 1C. In this case, for example, the arrangement of the dynodes of the electron multiplying unit 30 is changed so that the electrons based on the electromagnetic wave incident from the window 11*a* can be collected by the electron collecting unit 40.

In the electron tubes 1, 1A, 1B, 1D, 1E, 1F, and 1G, the meta-surface 50 of the electron emitting unit 20 may be a so-called reflective meta-surface, as in the electron tube 1C. In a case in which the reflective meta-surface is used, the electron tube is configured such that the meta-surface 50 faces the window 11*a* and faces the incidence surface 35 of the electron multiplying unit 30.

The shape of each of the housings 10 and 80 is not limited to the circular cylindrical shape. For example, each of the housings 10 and 80 may include a tubular shape with a polygonal cross-section.

In the electron tube 1F, a sweep electrode may be provided between the meta-surface 50 and the microchannel plate 70. As a result, a so-called streak tube may be configured. In this case, a slit arranged to cause measured light to be incident and a lens system arranged to capture a slit image may be provided outside the window 11*a* of the electron tube 1F functioning as the streak tube. As a result, a so-called streak camera may be configured.

In the imaging device 90, the electrons multiplied by the microchannel plate 70 in the electron tube 1F are collected in the fluorescent body 81, and the light emitted from the fluorescent body 81 is imaged by the imaging unit 93 provided outside the electron tube 1F. In this regard, the electron tube may be configured to function as the imaging device by providing an electron-bombarded solid-state image sensor, instead of the fluorescent body 81, as the electron collecting unit 40 in the electron tube. In this case, the electrons multiplied by the microchannel plate 70 are imaged by the electron-bombarded solid-state image sensor without providing the imaging unit 93 outside the electron tube. The electron-bombarded solid-state image sensor is, for example, an electron-bombarded charge-coupled Device (EBCCD).

REFERENCE SIGNS LIST

1, 1A, 1B, 1C, 1D, 1E, 1F, 1G electron tube
10, 80 housing
11*a* window
20 electron emitting unit
21 substrate
21*a*, 21*b* principal surface
30 electron multiplying unit
35 incidence surface
40 electron collecting unit
41 anode
50 meta-surface
60 diode
70 microchannel plate
81 fluorescent body

90 imaging device
93 imaging unit

The invention claimed is:

1. An electron tube comprising:
a housing internally held in a vacuum and including a window configured to transmit an electromagnetic wave;
an electron emitting unit disposed in the housing and including a meta-surface configured to emit an electron in response to incidence of the electromagnetic wave;
an electron multiplying unit disposed in the housing and configured to multiply the electron emitted from the electron emitting unit; and
an electron collecting unit disposed in the housing and configured to collect electrons multiplied by the electron multiplying unit, wherein
the meta-surface includes a metal layer forming a plurality of antennas,
the plurality of antennas has a size depending on the wavelength of the electromagnetic wave, and
the window includes at least one selected from quartz, silicon, germanium, sapphire, zinc selenide, zinc sulfide, magnesium fluoride, lithium fluoride, barium fluoride, calcium fluoride, magnesium oxide, and calcium carbonate.

2. The electron tube according to claim 1, wherein
the electron emitting unit includes a substrate including a first principal surface provided with the meta-surface and a second principal surface opposite to the first principal surface,
the electron multiplying unit includes an incidence surface on which the electron emitted from the electron emitting unit is incident, and
the substrate has transparency for the electromagnetic wave passing through the window and is disposed in such a manner that the first principal surface faces the incidence surface of the electron multiplying unit and the second principal surface faces the window.

3. The electron tube according to claim 1, wherein
the electron multiplying unit includes an incidence surface on which the electron emitted from the electron emitting unit is incident, and
the meta-surface is provided on the window to face the incidence surface of the electron multiplying unit.

4. The electron tube according to claim 1, wherein
the electron emitting unit includes a substrate including a first principal surface provided with the meta-surface and a second principal surface opposite to the first principal surface,
the electron multiplying unit includes an incidence surface on which the electron emitted from the electron emitting unit is incident, and
the substrate is disposed in such a manner that the first principal surface faces the window and the incidence surface of the electron multiplying unit.

5. The electron tube according to claim 1, wherein the meta-surface is included in a patterned metal layer.

6. The electron tube according to claim 1, wherein the electron multiplying unit and the electron collecting unit are a diode and are integrally configured.

7. The electron tube according to claim 1, wherein
the electron multiplying unit includes a plurality of dynodes spaced away from each other, and
the electron collecting unit includes an anode or a diode arranged to collect the electrons multiplied by the electron multiplying unit.

8. The electron tube according to claim 1, wherein
the electron multiplying unit includes a microchannel plate, and
the electron collecting unit includes an anode or a diode arranged to collect the electrons multiplied by the electron multiplying unit.

9. The electron tube according to claim 1, wherein
the electron multiplying unit includes a microchannel plate, and
the electron collecting unit includes a fluorescent body arranged to receive the electrons multiplied by the electron multiplying unit and emit light.

10. An imaging device comprising:
the electron tube according to claim 9; and
an imaging unit configured to capture an image based on light from the fluorescent body.

* * * * *